United States Patent [19]
Meier et al.

[11] Patent Number: 5,042,993
[45] Date of Patent: Aug. 27, 1991

[54] GAS SEPARATING MEMBRANES FROM POLYIMIDE POLYMERS

[75] Inventors: Ingrid K. Meier, Easton; Michael Langsam, Allentown, both of Pa.

[73] Assignee: Air Products and Chemicals, Inc., Allentown, Pa.

[21] Appl. No.: 557,271

[22] Filed: Jul. 24, 1990

[51] Int. Cl.$^5$ .................. B01D 53/22; B01D 71/64
[52] U.S. Cl. ............................. 55/16; 55/68; 55/158
[58] Field of Search ..................... 55/16, 68, 158

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn | 55/16 X |
| 3,846,521 | 11/1974 | Osterholtz | 55/16 X |
| 4,378,400 | 3/1983 | Makino et al. | 428/220 |
| 4,528,004 | 7/1985 | Makino et al. | 55/16 X |
| 4,657,564 | 4/1987 | Langsam | 55/16 |
| 4,690,873 | 9/1987 | Makino et al. | 55/16 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,746,474 | 5/1988 | Kohn | 55/16 X |
| 4,776,936 | 10/1988 | Smith et al. | 55/16 X |
| 4,830,640 | 5/1989 | Nakamura et al. | 55/16 X |
| 4,838,900 | 6/1989 | Hayes | 55/16 |
| 4,880,442 | 11/1989 | Hayes | 55/16 |
| 4,897,092 | 1/1990 | Burgoyne, Jr. et al. | 55/16 |
| 4,929,405 | 5/1990 | Kohn | 55/16 X |
| 4,932,982 | 6/1990 | Hayes | 55/16 |
| 4,932,983 | 6/1990 | Hayes | 55/16 |
| 4,948,400 | 8/1990 | Yamada et al. | 55/16 X |
| 4,952,220 | 8/1990 | Langsam et al. | 55/16 X |
| 4,964,887 | 10/1990 | Shimatani et al. | 55/16 |

OTHER PUBLICATIONS

T. H. Kim et al., "Reverse Permselectivity" of $N_2$ over $CH_4$ in Aromatic Polyimides, 1987; pp. 1767–1771; J. Appl. Poly. Sci., 34.

Anshyang A. Lin et al., "On the Cross-Linking Mechanism of Benzophenone-Containing Polyimides", pp. 1165–1169; Macromolecules, 21, 1988.

Sumio Yamada et al.: Permeation and Separation of Helium through UV-Irradiated Aromatic Linear Polymers, Kobunshi Ronbunshu, 40(1); 35–40 (1988).

*Primary Examiner*—Robert Spitzer
*Attorney, Agent, or Firm*—Keith D. Gourley; James C. Simmons; William F. Marsh

[57] ABSTRACT

The present invention is a class of semi-permeable polyimide membranes and a process for using such membranes to separate one or more components of a gaseous mixture. The membranes are prepared from a polyimide having surface-modifiable functionalities comprising repeating units formed from an aromatic dianhydride and an alkyl-substituted phenylenediamine having at least one hydrogen atom located on a ring position ortho to an amine nitrogen. The membranes formed therefrom are contacted in the presence of an oxygen source with an activating force such as high energy electromagnetic irradiation to effect modification of the polymer surface. The surface-modified polyimide membranes exhibit high gas perm-selectivities and are especially useful in effecting the separation of oxygen and nitrogen from air.

23 Claims, No Drawings

GAS SEPARATING MEMBRANES FROM POLYIMIDE POLYMERS

TECHNICAL FIELD

The present invention relates to polymeric membranes, and in particular, to polymeric membranes formed from surface-modified polyimides and a process for using such membranes to separate gaseous mixtures into their respective components.

BACKGROUND OF THE INVENTION

The ever increasing demand for cryogenic gases has led to a search for improved processes for separating the respective components of various gaseous mixtures, including air. Considerable investigation is being conducted in the area of semi-permeable polymeric membranes wherein such membranes exhibit selectivity toward the passage of one or more components of the gaseous mixture through the membrane.

Commercial applications for gas separation devices based on polymeric materials rely, in part, on maximizing the overall gas flux through the membrane. T. H. Kim, et al., J. Appl. Poly. Sci., 34 1767 (1987), report that membrane gas flux is related to the average space between the polymer chains. The investigators indicate that the density of the polymer can also be correlated to the overall gas flux.

The success of commercial gas separation applications utilizing polymeric membranes depends upon the identification of polymers having sufficiently high gas flux, high selectivity and good thermo-mechanical properties. High overall flux values are typically exhibited in polymers having low chain-chain interactions as exemplified by polymers such as poly(dimethylsiloxane) and poly(4-methyl-1-pentene). Materials having high gas flux values typically possess low glass transition temperatures (Tg) because of low chain-chain interactions in the polymeric material. As a consequence, these materials typically require special processing conditions to build in chemical and/or physiochemical crosslinking if such materials are to be employed in other than low temperature applications. In contrast, polymers having strong chain-chain interactions typically have rather high Tg values and often exhibit rather low gas flux values.

Polyimides, which generally have strong chain-chain interactions and high Tg values, have been reported to exhibit rather high gas flux values when certain structural moieties are present. Specifically, U.S. Pat. No. 3,822,202 (1974); Re 30,351 (1980) discloses a process for separating fluids using a semi-permeable membrane formed from polyimides, polyesters or polyamides. The repeating units of the main polymer chain have at least one rigid divalent sub-unit, the two main chain single bonds extending therefrom which are not colinear, which are sterically unable to rotate 360° around at least one of these bonds and have 50% or more of its main chain atoms as members of aromatic rings.

U.S. Pat. No. 4,705,540 discloses a highly permeable aromatic polyimide gas separation membrane and processes for using such a membrane. The membrane is formed from an aromatic polyimide having repeating units of a rigid phenylenediamine having substituents on all of the positions ortho to the amine nitrogen atoms and acid anhydride units which are essentially all attached to rigid aromatic moieties.

U.S. Pat. Nos. 4,717,393 and 4,717,394 teach polymeric membranes and processes for using such membranes for separating components of a gaseous mixture. The membranes disclosed in both of these patents are formed from semi-flexible, aromatic polyimides prepared by polycondensation of dianhydrides with phenylenediamines having alkyl substituents on all positions ortho to the amine functions, or with mixtures of other non-alkylated diamines, some components having substituents on all positions ortho to the amine functions. Membranes formed from this class of polyimides are stated to exhibit improved environmental stability and gas permeability due to optimization of the molecular free volume. Such membranes can also be photochemically crosslinked which in some instances results in a better performing semi-permeable membrane.

U.S. Pat. No. 4,378,400 discloses gas separation membranes formed from aromatic polyimides based upon biphenyltetracarboxylic dianhydride for separating various gaseous mixtures.

Attempts have been made to synthesize membranes having high flux and high selectivity by creating a composite structure on the surface of the polymer by means of a chemical reaction between a labile polymer functionality and some "activating force". Such methods are taught in U.S. Pat. No. 4,657,564 wherein poly(1-trimethylsilylpropyne) is treated with a dilute fluorine gas stream and in U.S. Pat. No. 4,717,393 wherein a polyimide containing a benzophenone-containing linking group is irradiated with a medium pressure mercury lamp.

U.S. Pat. No. 4,838,900 discloses aromatic polyimides prepared by polycondensation of dianhydrides with methylene dianilines having substituents on all positions ortho to the amine functions to form membranes having high gas permeability. The gas permeability of the subject membranes is stated to increase substantially if structurally-rigid dianhydrides are used in combination with the substituted diamines.

Yamada and coworkers, Kobunshi Ronbunshu, 40(1)35-40 )1983), disclose gas separating membranes formed of a polyimide, polysulfone or poly(ethylene terephthalate) which have been irradiated by ultraviolet lights in the presence of helium, oxygen or nitrogen atmospheres. Kapton H-type polyimide film produced by DuPont De Nemours, Hilmington, Delaware, which was irradiated by ultraviolet light in an atmosphere of air provided enhanced selectivity in the separation of light gases such as hydrogen and helium.

A need in the art exists for the identification of thin film polymers which provide enhanced selectivity for various gas separation applications while also possessing good mechanical properties and sufficient permeability.

BRIEF SUMMARY OF THE INVENTION

The present invention is a class of semi-permeable polyimide membranes and a process for using such membranes to separate one or more components of a gaseous mixture. The polyimide membranes are prepared from a polyimide having surface-modifiable functionalities comprising repeating units formed from an aromatic dianhydride and an alkyl-substituted phenylenediamine having at least one hydrogen atom located on a ring position ortho to an amine nitrogen. The polyimide polymer or the membrane formed therefrom is subsequently surface-modified in the presence of an oxygen source by treatment with an activating force such as high energy electromagnetic irradiation or with a free radical source to impart high selectivity to the membrane without causing a large decrease in composite permeance. The surface-modified polyimide membrane provides enhanced selectivity for various gas separation applications including the separation of oxygen and nitrogen from air.

DETAILED DESCRIPTION OF THE INVENTION

The present invention relates to a class of surface-modified semi-permeable membranes which exhibit unexpectedly high selectivity properties. The semi-permeable membranes, formed of polyimides having surface-modifiable functionalities, are prepared by reacting an aromatic dianhydride and an alkyl-substituted phenylenediamine having at least one hydrogen atom located on a ring position ortho to an amine nitrogen. The polyimide polymer containing surface-modifiable functionalities or the membrane formed therefrom is then contacted in the presence of an oxygen source with an activating force such as high energy electromagnetic irradiation or a free radical source to form a surface-modified polyimide which exhibits unexpectedly high selectivity than would be expected in view of membranes known in the art.

We have found that contrary to the teachings of the prior art, membranes having high molecular weight, good mechanical properties and high free volume can be obtained by contacting the specific polyimides according to this invention with an activating force to obtain a membrane having high selectivity without suffering a large decrease in composite permeance. Such a result is most unexpected in view of U.S. Pat. Nos. 4,717,393 and 4,717,394 which teach membranes formed from a polyimide prepared by polycondensation of an aromatic dianhydride and a phenylenediamine wherein alkyl substituents are required on all positions ortho to the amine functions to realize an enhancement to perm-selectivity and data which demonstrate that polyimides formed from a phenylenediamine having no alkyl substituents (i.e., hydrogen atoms located on all ring positions ortho to an amine) are not susceptible to oxidative surface modification.

The polyimide polymers from which the membranes are formed comprise repeating units of the general structural formula:

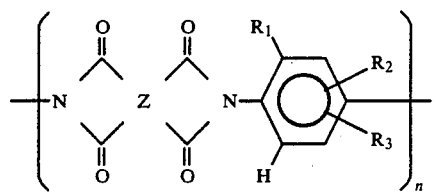

wherein $R_1$, $R_2$ and $R_3$ are independently selected from a hydrogen atom or a linear or branched cyclic or acyclic alkyl group having from 1 to about 6 carbon atoms, with the proviso that at least $R_1$, $R_2$ or $R_3$ is an alkyl group; and Z is

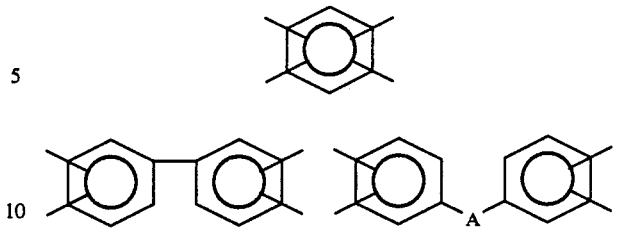

wherein A is $C(CH_3)_2$, $C(CF_3)_2$, S or $SO_2$.

Minor amounts of other monomers may be present which do not affect the gas separation properties of the resultant membrane.

The polyimide polymer or the membrane formed therefrom is subsequently contacted in the presence of an oxygen source with an activating force to effect modification of the membrane surface. Suitable activating forces include high energy electromagnetic irradiation. Examples of sources of such electromagnetic irradiation include longwave and shortwave ultraviolet irradiation and X-ray irradiation.

Alternatively, the activating force may be a free radical source which is contacted with the surface of the polymer, such free radical sources including, but not limited to, volatile peresters, peroxides and azo compounds. The surface-modified polymer may then be subjected to thermal activation with or without metal accelerators.

An advantage of the present invention is that photosensitizers and chromophores such as the benzophenone moiety are not required to render the polyimide susceptible to oxidative surface modification. However, photosensitizers known in the art may be utilized if desired. The improvements in selectivity afforded by the oxidative surface modification according to the present invention cannot be achieved if the irradiation step is conducted in an inert atmosphere such as nitrogen or helium.

Surface modification of the subject polyimide polymers is believed to provide a membrane whose bulk, having a combination of high flux and low selectivity, provides mechanical support for the modified surface layer which imparts high selectivity without causing a drastic reduction in the composite permeance. The thickness of the thin film of surface-modified polymer formed at the polymer surface will depend upon the intensity and duration of the high energy electromagnetic radiation source, the concentration of the free radical source and the like. The thickness of the membrane is not critical so long as the membrane has a thickness sufficient to be contiguous.

Moreover, the molecular weight of the polyimide from which the membrane is formed is not critical. However, the polymer should be of sufficient molecular weight so as to be able to be cast into membrane form. Membranes can be prepared according to methods well known in the art and can be used in the form of flat sheets, spiral wound sheets, hollow fiber and the like. Optionally, the membrane can be supported on a permeable support material.

In a preferred embodiment, the semi-permeable membranes are formed of a polyimide having surface-modifiable functionalities comprising repeating units of the general structural formula:

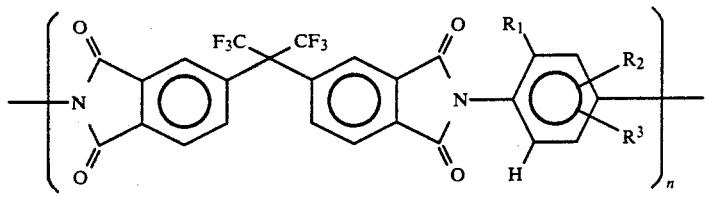

wherein $R_1$, $R_2$ and $R_3$ are independently selected from a hydrogen atom or a linear or branched cyclic or acyclic alkyl group having from 1 to about 6 carbon atoms, with the proviso that at least $R_1$, $R_2$ or $R_3$ is an alkyl group.

The above-disclosed polyimides having surface-modifiable functionality or the membranes formed therefrom are contacted in the presence of an oxygen source with an ultraviolet irradiation source. The preferred ultraviolet source emits energy having a wavelength ranging from about 200 to about 300 nm. Suitable sources of oxygen include an atmosphere containing at least 5 mole % oxygen such as air.

The present invention also contemplates a membrane which has been subjected to an activating force having sufficient intensity such that the bulk of the polymer, as opposed to merely the surface, is modified (i.e., the modification to the polymer structure is not limited to the surface). Consequently, for purposes of interpreting the Specification and the appended claims, the term, surface-modifiable functionality, shall refer to structural moieties of the polymer chain which, in the presence of an oxygen source, will undergo structural modification upon being subjected to a suitable activating force as described herein.

The membranes can be used for a wide variety of gas separations and are particularly well suited for separating oxygen and nitrogen from air. The process for separating a feedstream containing at least two components having different permeability rates through the membrane comprises bringing the gaseous mixture in contact with the membrane whereby the more permeable component of the gaseous mixture permeates the membrane at a faster rate than the other component thereby separating the components of the feedstream.

The following examples were carried out and are presented to better illustrate the present invention and are not meant to be limiting.

EXAMPLES 1-3

Preparation of Polyimides by Condensing 6F-Dianhydride with Alkyl-Substituted Phenylenediamines General Procedure The following procedures were used to prepare polyimides by condensing 5,5'-[2,2,2-trifluoro-1-(trifluoromethyl)ethylidinel bis-1,3-isobenzofuranedione (6F-dianhydride)with the substituted phenylenediamines indicated in Table 1. Variations in the reaction parameters as a function of the particular alkyl-substituted phenylenediamine used to make the polyimide polymer reflect the specific conditions required to obtain good, film-forming polyimides.

Polyamic Acid Preparation

A 200.00 g (0.04502 mol) portion of 6F-dianhydride was added proportionately through the course of 0.5 hr to a solution of 0.04502 mol of the desired alkyl-substituted phenylenediamine in anhydrous N,N-dimethylacetamide (DMAC). During the addition, the mixture was stirred mechanically under an inert nitrogen blanket. The initial reaction temperature was 25° C. The amount of DMAC used in the synthesis was correlated with the percent solids concentration indicated in Table 1. Approximately one hour after the addition of dianhydride, the reaction temperature was maintained at 25° C. and the reaction mixture was stirred for the indicated reaction time. This resultant polyamic acid product solution was used directly in preparing the corresponding polyimide solution.

Polyimide Preparation

The solids concentration of the polyamic acid solution was adjusted with DMAC to the values indicated in Table 1. Acetic anhydride (9.18 g, 0.0900 mol) and 2.27 g (0.0225 mol) of triethylamine were added to the polyamic acid solution and the solution was heated to 60° C. for 3 hr with stirring. After cooling, the polyimide solution was cast on glass plates, and polyimide films (ca. 100 micron thick) were obtained after vacuum drying at 70° C./0.200 mm Hg. The films were cooled to 25° C. then removed from the vacuum oven. The polyimide membrane films obtained after this drying procedure were determined to contain less than 0.5 wt % residual DMAC as determined by thermal gravimetric analysis (TGA).

EXAMPLE 4

Irradiation of Homopolyimide Polymers

Dense films of the individual homopolymers according to Examples 1-3, respectively, and various comparative examples were irradiated in the presence of an oxygen source (i.e., air) for various lengths of time using a Hanovia 450 watt medium pressure UV lamp (Ace Glasswear Catalog #7825-34). The resultant surface-modified membranes were tested for oxygen permeance and $O_2/N_2$ selectivity. The oxygen permeability, $P(O_2)$ and the oxygen/nitrogen selectivity $\alpha(O_2/N_2)$ were measured using a CSI-135 gas permeability cell, purchased from Customer Scientific Industries; Whippany, NJ., when $P(O_2)$ was greater than 10 barrers or a CSI-89 gas permeability cell, purchased from the same source, when $P(O_2)$ was less than 10 barrers.

TABLE 1
Preparation of Polyimide Homopolymers

[Polyimide structure: repeating unit with two phthalimide groups connected via C(CF$_3$)$_2$, with N—X linkage]

| Example | —X— | Initial Reaction Temp (°C.) | Reaction Time (hrs) | % Solids Polyamic Acid Solution | % Solids Imidization | Polyimide Film Tg (°C.) | Polyimide Film IV |
|---|---|---|---|---|---|---|---|
| 1 | [1,4-phenylene with X substituents] | 25 | 72 | 40 | 25 | >400 | .598 |
| 2 | [phenylene with one X substituent] | 25 | 17 | 25 | 20 | 329 | .742 |
| 3 | [phenylene with methyl substituents] | 25 | 17 | 35 | 25 | 327 | .644 |

Membrane permeability and selectivity data for various polyimide membranes are presented in Table 2. Runs 3 through 5, prepared according to Examples 1 through 3, respectively, demonstrate the permeability and selectivity data of the claimed polyimide membranes, both before and after oxidative surface modification. Runs 1 and 2 represent comparative examples of the surface-modified polyimides according to U.S. Pat. Nos. 4,717,393 and 4,717,394 which teach that essentially all positions ortho to an amine nitrogen must be occupied by an alkyl group. Runs 6 and 7 represent comparative examples of membranes formed of a polyimide polymer having repeating units formed from an aromatic dianhydride and an aromatic diamine wherein all positions ortho to an amine nitrogen are occupied by hydrogen atoms.

Runs 3 through 5, inclusive demonstrate that the oxidative surface modification of membranes prepared utilizing the polyimides of the present invention provide enhanced selectivity without causing an inordinately large decrease in composite permeance. In particular, Run 3 provides greater than a 100% increase in selectivity following ultraviolet irradiation for 60 minutes at a wavelength ranging from 200 to about 300 nm. These results are unexpected in view of U.S. Pat. Nos. 4,717,393 and 4,717,394 which fail to teach or suggest the subject polyimide membranes and Runs 6 and 7 which demonstrate that polyimides formed of an aromatic dianhydride having hydrogen atoms on all positions ortho to the amine nitrogen are not susceptible to oxidative surface modification by an activating force as disclosed herein.

The membranes according to the present invention are also unique in that the large increase in selectivity following oxidative surface modification is afforded without the use of added components such as sensitizers, chain carriers and the like, which eliminates complications in the membrane formation step, the surface modification step and the use of the resulting membranes to separate various gaseous mixtures.

Having thus described the present invention, what is now deemed appropriate for Letters Patent is set out in the following appended claims.

TABLE 2
Irradiation of Various Polyimide Homopolymers

[Polyimide structure: repeating unit with two phthalimide groups connected via C(CF$_3$)$_2$, with N—X linkage]

| Run | Example | UV Time (min.) | $\overline{P}$ (O$_2$)$^a$ (Barrers) | $\alpha$ (O$_2$/N$_2$)$^a$ (based on P) |
|---|---|---|---|---|
| 1$^b$ | [tetramethyl phenylene] | 30 | 44.38/14.25 | 3.80/8.71 |

TABLE 2-continued

Irradiation of Various Polyimide Homopolymers

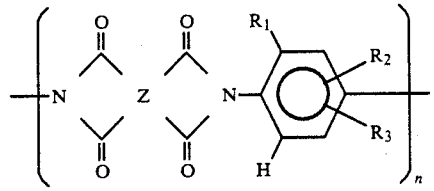

| Run | Example | UV Time (min.) | $\overline{P}(O_2)^a$ (Barrers) | $\alpha$ $(O_2/N_2)^a$ (based on P) |
|---|---|---|---|---|
| $2^b$ | | 30 | 138.7/20.32 | 4.21/9.00 |
| 3 | | 60 | 110.8/26.93 | 4.10/7.26 |
| 4 | | 60 | 20.32/15.62 | 4.97/5.94 |
| 5 | | 60 | 16.92/18.33 | 3.98/4.66 |
| $6^b$ | | 60 | 1.49/2.10 | 6.38/6.55 |
| $7^b$ | | 60 | 5.07/4.60 | 5.67/5.81 |

[a] before irradiation/after irradiation
[b] comparative example

We claim:

1. A semi-permeable membrane formed of a polyimide having surface-modifiable functionalities, the polyimide comprising repeating units formed from a dianhydride and an alkyl-substituted phenylenediamine having at least one hydrogen atom located on a ring position ortho to an amine nitrogen wherein the polyimide having surface-modifiable functionalities is contacted in the presence of an oxygen source with a source of high energy electromagnetic irradiation or a free radical source to effect modification of the polymer surface.

2. The semi-permeable membrane according to claim 1 wherein the oxygen source is an atmosphere containing at least 5% oxygen.

3. The semi-permeable membrane according to claim 2 wherein the atmosphere containing at least 5% oxygen is air.

4. The semi-permeable membrane according to claim 1 wherein the source of high energy electromagnetic irradiation is ultraviolet irradiation.

5. The semi-permeable membrane according to claim 4 wherein the ultraviolet irradiation source is focused between about 200 and 300 nm.

6. The semi-permeable membrane according to claim 4 wherein the polyimide is contacted with an activating force in the presence of a photosensitizer.

7. The semi-permeable membrane according to claim 1 which has been contacted with a free radical source selected from the group consisting of volatile peresters, peroxides and azo compounds followed by thermal activation with or without metal accelerators.

8. A semi-permeable membrane formed of a polyimide having surface modifiable functionalities, the polyimide comprising repeating units of the general structural formula:

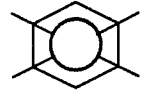

wherein $R_1$, $R_2$ and $R_3$ are independently selected from a hydrogen atom or a linear or branched cyclic or acyclic alkyl group having from 1 to about 6 carbon atoms, with the proviso that at least $R_1$, $R_2$ or $R_3$ is an alkyl group; and Z is

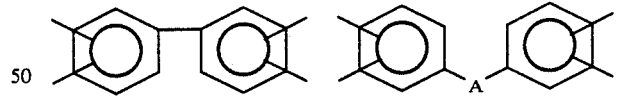

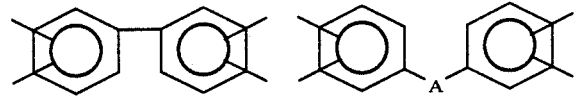

wherein A is $C(CH_3)_2$, $C(CF_3)_2$, O, S or $SO_2$; wherein the polyimide having surface-modifiable functionalities is contacted in the presence of an oxygen source with an ultraviolet energy source.

9. The semi-permeable membrane according to claim 8 wherein the ultraviolet energy source is focused between about 200 and 300 nm.

10. The semi-permeable membrane according to claim 9 wherein the oxygen source is an atmosphere containing at least 5% oxygen.

11. The semi-permeable membrane according to claim 9 wherein the oxygen source is air.

12. A semi-permeable membrane formed of a polyimide having surface modifiable functionalities, the polyimide comprising repeating units of the general structural formula:

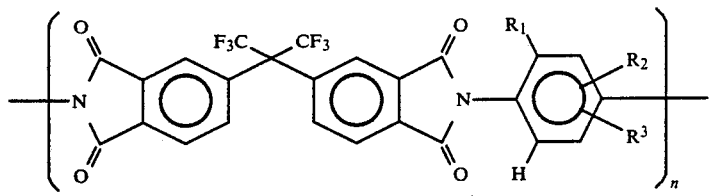

wherein $R_1$, $R_2$ and $R_3$ are independently selected from a hydrogen atom or a linear or branched cyclic or acyclic alkyl group having from 1 to about 6 carbon atoms, with the proviso that at least $R_1$, $R_2$ or $R_3$ is an alkyl group; wherein the polyimide having surface-modifiable functionalities is contacted in the presence of an oxygen source with an ultraviolet irradiation source.

13. The semi-permeable membrane according to claim 12 wherein the ultraviolet irradiation source is focused between about 200 and 300 nm.

14. The semi-permeable membrane according to claim 13 wherein the oxygen source is an atmosphere containing at least 5 mole % oxygen.

15. The semi-permeable membrane according to claim 14 wherein the oxygen source is air.

16. The semi-permeable membrane according to claim 14 wherein $R_1$ and $R_3$ are tert-butyl and $R_2$ is a hydrogen atom.

17. The semi-permeable membrane according to claim 14 wherein $R_1$ is tert-butyl and $R_2$ and $R_3$ are hydrogen atoms.

18. A process for separating a gaseous mixture containing two or more components, the process comprising: bringing the gaseous mixture into contact with one side of a permselective membrane according to claim 1 whereby one component selectively permeates through the membrane at a different productivity rate than at least one other component.

19. A process according to claim 18 wherein the gaseous mixture comprises nitrogen and air.

20. A process for separating a gaseous mixture containing two or more components, the process comprising: bringing the gaseous mixture into contact with one side of a permselective membrane according to claim 8 whereby one component selectively permeates through the membrane at a different productivity rate than at least one other component.

21. A process according to claim 20 wherein the gaseous mixture comprises nitrogen and air.

22. A process for separating a gaseous mixture containing two or more components, the process comprising: bringing the gaseous mixture into contact with one side of a permselective membrane according to claim 12 whereby one component selectively permeates through the membrane at a different productivity rate than at least one other component.

23. The process according to claim 22 wherein the gaseous mixture comprises nitrogen and air.

* * * * *

UNITED STATES PATENT AND TRADEMARK OFFICE
CERTIFICATE OF CORRECTION

PATENT NO. : 5,042,993
DATED : August 27, 1991
INVENTOR(S) : Meier et al.

It is certified that error appears in the above-identified patent and that said Letters Patent is hereby corrected as shown below:

Column 2, Line 41, delete "40(1)35-40)1983," and insert -- 40(1) 35-40 (1983), --.

Column 2, Line 46, delete "Hilmington" and insert -- Wilmington --.

Column 4, Line 13, between "C(CF$_3$)$_2$," and "S" insert -- O, --.

Column 5, Line 64, "ethylidinel" should be -- ethylidine] --.

Column 6, Line 60, delete "#7825-34}" and insert -- #7825-34) --.

Column 12, Line 24, Claim 21, delete "A" and insert -- The --.

Signed and Sealed this

Twenty-ninth Day of December, 1992

Attest:

DOUGLAS B. COMER

*Attesting Officer*  *Acting Commissioner of Patents and Trademarks*